April 20, 1926.
F. W. LAMBERT
STEERING CONTROL
Filed Oct. 13, 1925
1,581,930
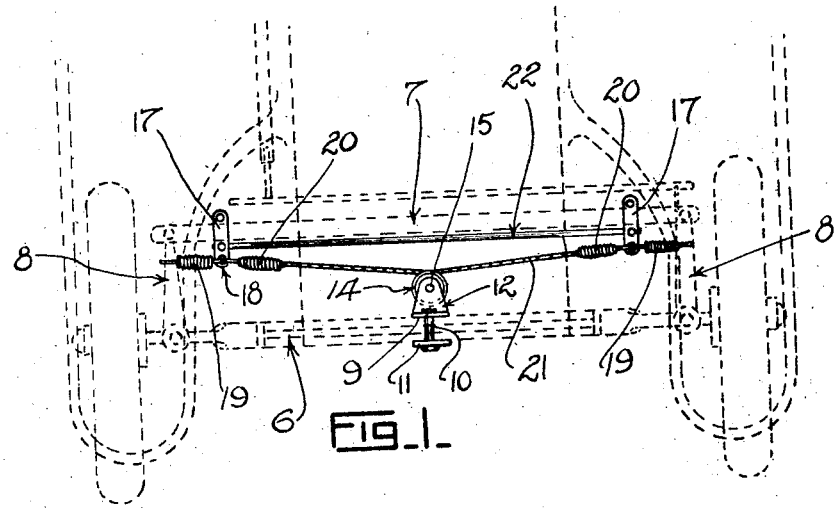
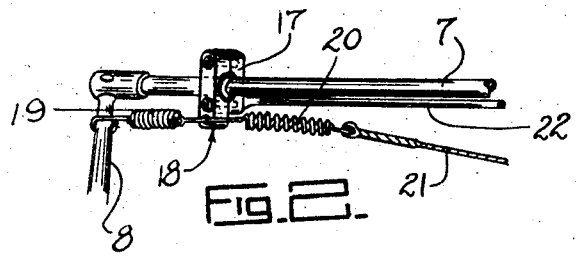
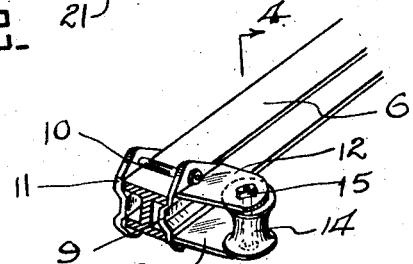
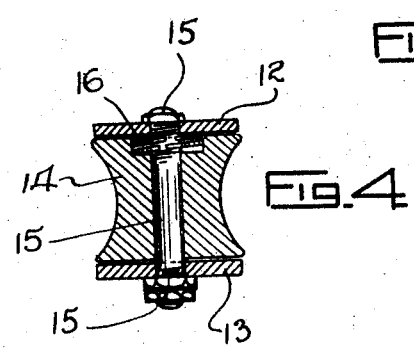

Patented Apr. 20, 1926.

1,581,930

UNITED STATES PATENT OFFICE.

FRANK WILLIAM LAMBERT, OF DARLINGHURST, NEAR SYDNEY, NEW SOUTH WALES, AUSTRALIA.

STEERING CONTROL.

Application filed October 13, 1925. Serial No. 62,272.

*To all whom it may concern:*

Be it known that I, FRANK WILLIAM LAMBERT, a subject of the King of Great Britain, residing at Darlinghurst, near Sydney, in the State of New South Wales, Commonwealth of Australia, have invented certain new and useful Improvements in Steering Controls, of which the following is a specification.

This invention relates to an improved steer control for motor cars and trucks, and has for its object, means whereby lateral road shocks, encountered by the front road wheels, are absorbed. It also has the effect of counteracting "back-lash", thereby reducing wear and tear on tyres, king pins, bushings, and other working parts of the steering mechanism.

According to the invention I attach or clamp to the front axle member about midway thereof, a rotatable member, such as a roller or wheel around or on which is adapted to pass a flexible connection as a wire rope or chain, on each end of which is interposed a tension spring secured, such as by a clamp, to the corresponding end of the tie or track rod. Each clamp or point of attachment is connected by a compression spring secured to the steering arm on the same side. A stay rod parallel with the tie rod, is interposed between these clamps or points of attachment to ensure rigidity.

But in order that my invention may be more readily understood, I will now refer to the accompanying drawings, which illustrate a practical construction.

Figure 1, is a plan view of the apparatus as attached to an existing motor vehicle, parts of which are shown in dotted lines.

Figure 2, is a part perspective view on an enlarged scale illustrating the attachment of the springs and clamps to the vehicle steering arm and tie rod respectively.

Figure 3, is a similar view showing how the rotatable roller is attached to the front axle member.

Figure 4, is a section on line 4—4, Figure 3, shown on an enlarged scale.

The same reference numerals indicate like parts throughout the drawings.

6 is the front axle member, 7 the tie or track rod, and 8—8 the steering arms for the front wheels, of a motor vehicle.

To the front axle member 6 is attached a member 9 by means of bolts 10, and a plate 11. This member 9 has upper and lower extensions 12 and 13 respectively, between which is positioned a roller 14 adapted to revolve on the spindle 15, being retarded in its rotary movement by the tension caused by the spring washer or washers 16. 17—17 are clamps rigidly attached to the tie or track rod 7, each being provided with an extension 18 to which the compression springs 19—19 are secured, their opposite ends being secured to the respective steering arms 8—8. 20—20 are tension springs having one end attached to the clamps 17—17 on the same side and the other end to a flexible cable 21. This cable is passed around the roller 14 several times in order that free movement of the cable may be retarded.

A stay rod 22 is interposed between the clamps 17—17 to prevent their movement and ensure rigidity.

Any backlash or looseness in the steering arms 8—8 and associated parts, are taken up by the springs 19—19 and 20—20, the flexible cable 21 being held taut by the springs 20—20. If the vehicle is traveling over bad roads and a pull is imparted to one end of the cable 21, such as on a front road wheel meeting an obstruction, the roller 14 retards the outward pull of the cable, and thereby counteracts any jarring effect to the steering mechanism, minimizing damage to these parts.

The device also tends to prevent the spindle control rod of the vehicle from stripping and coming apart, and the wheels of the vehicle locking, and ensures quick and ready response to any movement of the steering wheel.

The flexible cable may have stops on opposite sides of the roller 14.

I claim:

1. Improved steer control for motor cars and trucks, comprising a rotatable member attached about midway to the front axle member, a flexible connection adapted to pass around or on said rotatable member, the opposite ends of said flexible connection having each a tension spring interposed between it and the corresponding end of the track rod and a compression spring secured to the steering arm on the same side and about the point of attachment of said tension spring.

2. Improved steer control for motor cars and trucks, comprising a rotatable member attached about midway to the front axle member, a flexible connection adapted to pass around or on said rotatable member, the opposite ends of said flexible connection having each a tension spring interposed between it and the corresponding end of the track rod, a compression spring secured to the steering arm on the same side and about the point of attachment of said tension spring, and a stay rod parallel with the track rod and positioned between the clamps or other points of attachment.

3. Improved steer control for motor cars and trucks, comprising a rotatable member attached about midway to the front axle member, a flexible connection adapted to pass around or on said rotatable member, the opposite ends of said flexible connection having each a tension spring interposed between it and the corresponding end of the track rod, a compression spring secured to the steering arm on the same side and about the point of attachment of said tension spring, said rotatable member being a roller provided with spring washer or washers, substantially as described and as illustrated in Figure 4.

In testimony whereof I have hereunto set my hand.

FRANK WILLIAM LAMBERT.